March 6, 1928. F. C. DAVIS 1,661,749
LUBRICATING DEVICE
Filed Jan. 7, 1926
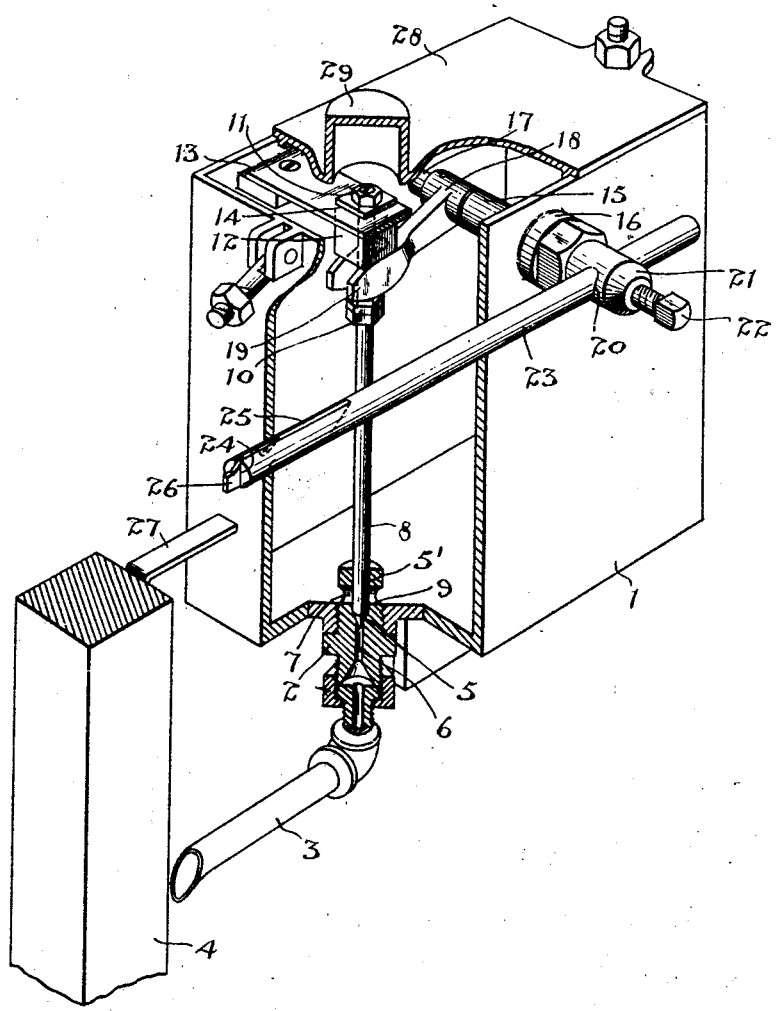
*Inventor.*
Francis C. Davis
by H. J. S. Dennison
Atty.

Patented Mar. 6, 1928.

1,661,749

UNITED STATES PATENT OFFICE.

FRANCIS C. DAVIS, OF TORONTO, ONTARIO, CANADA.

LUBRICATING DEVICE.

Application filed January 7, 1926. Serial No. 79,805.

The principal objects of the invention are, to effect a substantial conservation in the use of oil on the guideways for elevators, or in lubricating other devices, and to provide a mechanism for feeding oil to the guideways or other working parts in a limited quantity.

A further object is to provide a simple and inexpensive structure which will operate very positively and will not be liable to get out of order.

The principal features of the invention consist in the novel construction and arrangement of parts, whereby a valve for regulating the flow of oil to a discharge conduit is maintained closed by gravity and is opened by a lifting means adapted to be operated by an engaging member.

The drawing represents a perspective view of my improved oiling device shown partly broken away and in part section.

In the lubricating of reciprocating devices such as elevators which operate on guides it is very important that such guides be properly lubricated from end to end and it is found in the practical operation of elevators that a very great amount of oil is wasted through an over supply of oil.

The present invention is particularly adaptable to elevator lubrication but is applicable to many other devices and it consists of a receptacle 1 in which a supply of oil is contained.

A nipple 2 is threaded into the bottom of the receptacle 1 and is connected with a suitable distributing tube 3 which directs the oil fed thereinto to the guide 4.

A valve seat 5 is formed intermediate of the length of the central bore 6 of the nipple which communicates with a cross passage 7 and a valve rod 8 sliding in the bore 5' is formed with a tapered end 9 adapted to engage and close the valve seat.

The upper end of the valve rod 8 is threaded and is provided with a pair of adjusting nuts 10 and a lock nut 11 at the top and a rectangular guide block 12 is adjustably threaded on the threaded end of the rod and secured by the lock nut 11.

A cross bar 13 rigidly secured between the sides of the receptacle 1 is formed with a rectangular opening 14 in which the guide block 12 is adapted to slide and said block is held thereby in axial alignment with the valve seat of the nipple 2.

A sleeve bearing 15 is threaded into a boss 16 on one side of the receptacle 1 and extends part way into the receptacle.

Rotatably mounted in the sleeve 15 is a spindle 17 and said spindle has secured to its inner end an arm 18 provided with a forked end 19 which straddles the valve rod 8, the upper and lower edges of the forks being longitudinally arc-shaped and engaging respectively the bottom end of the block 12 and the upper side of the nut 10.

The rocking of the spindle 17 in the sleeve bearing swings the arm 18 upwardly and downwardly and the arc-shaped edges of the forked end of the arm either lifts or depresses the valve.

The spindle 17 is provided with a transverse hole 20 through its outer enlarged end 21 and a suitable set screw 22 is threaded in the end of the spindle to lock the rod 23 inserted in the hole 20.

The rod extends parallel with the side wall and past the receptacle 1 and its outer end is formed with a vertical slot 24, which slot at its inward end is bevelled, as shown by dotted lines.

A flat piece of metal 25 is pivotally supported in the slot 24 and has one end bevelled to match the bevelled end of the slot and the end 26 projects beyond the outer end of the rod 23 and is adapted to engage a suitable stop 27 arranged in a suitable fixed position so that the latch piece 25 will engage it as the receptacle moves up and down.

The receptacle is provided with a suitable cover 28 which is here shown with a cup 29 in the top to allow the valve to raise and lower. The receptacle is placed on an elevator or other device which requires measured lubrication and is filled with a suitable lubricant.

The weight of the valve rod 8 with the heavy guide block 12 and nuts attached thereto holds the valve in a closed position and as the forked arm 18 and the operating rod 23 both extend in the same direction horizontally, their weight is added to the weight of the valve rod.

When the device is placed on a reciprocating member and the oil receptacle moves upward the latch member 25 engaging the stop 27 merely swings on its pivot in the rod 23 but when the receptacle moves in the return direction the latch member comes in contact with the stop 27 and the bevelled end thereof engaging the end of the slot, the free end of the rod 23 is lifted. This causes the spindle 17 to be rotated in the sleeve 15, thus raising the arm 18 and lifting the valve. The valve thus lifted is held open only just a sufficient length of time to allow the desired quantity of lubricant to flow out through the distributing member to the guide and upon sliding over the stop the rod 23 and arm 18 drop under their own weight and the valve rod entering the bore 5′ forces the oil contained therein outward and then closes against the valve seat sealing the receptacle effectively so that the oil will not leak.

A construction such as described requires no springs. It is very positive in its action and it can be regulated very accurately by the adjustment of the guide block 12 and nuts 11.

The structure is extremely simple and cheap to manufacture and there is nothing to get out of order and it provides a very effective and positive means of lubricating the guides of an elevator or it may be used advantageously on many different forms of machines.

What I claim as my invention is:—

1. A lubricating device, comprising a receptacle having a discharge opening at the bottom and a valve seat in said opening, a valve rod closing against said valve seat and slidably supported in rigid guides and adapted to close said seat against the passage of oil, a pivotal arm within the receptacle operatively connected with said valve, a rod outside of the receptacle connected with said pivotal arm and adapted through the action of gravity thereon to normally effect the closing of said valve, and means adapted to periodically engage said outside rod to tilt the same to actuate said pivotal arm and open the valve connected therewith.

2. A lubricating device, comprising a receptacle having a discharge opening in the bottom, a valve seat, a vertical valve rod, a guide block threaded on the upper end of said rod, a lock nut threaded on the rod and engaging said block, a shoulder on the valve rod below the guide block, a forked arm pivotally mounted in the receptacle and straddling the valve rod between the guide block and said shoulder, a rod operatively connected with said arm and projecting from the receptacle and adapted through the action of gravity thereon to normally force the arm into engagement with said shoulder to hold the valve down to its seat, and means mounted independent of the casing adapted to periodically engage and tilt said rod to raise said arm and lift the valve from its seat.

3. A lubricating device, comprising a receptacle, a horizontal spindle rotatably mounted in said receptacle, a discharge opening in the bottom of said receptacle, a valve controlling said discharge opening, means connected with said spindle for operating the valve in both directions, a rod extending horizontally from said spindle, said rod having a slotted end, and a latch member pivoted in the slotted end of said rod adapted to swing freely in one direction and to lock with said rod in the other direction.

FRANCIS C. DAVIS.